United States Patent [19]

Yamamoto

[11] Patent Number: 5,177,934
[45] Date of Patent: Jan. 12, 1993

[54] PACKAGED TOILET PAPER AND METHOD OF MANUFACTURING THEREOF

[75] Inventor: Yoshitomo Yamamoto, Kitakyushu, Japan

[73] Assignee: Daiho Giken Co., Ltd., Kitakyushu, Japan

[21] Appl. No.: 765,342

[22] Filed: Sep. 25, 1991

[30] Foreign Application Priority Data

Dec. 28, 1990 [JP] Japan ............................. 2-418661
Feb. 22, 1991 [JP] Japan ............................. 3-114160

[51] Int. Cl.⁵ .................... A47K 10/16; A47K 10/20; B65B 61/24; B65H 19/02
[52] U.S. Cl. ............................. 53/429; 53/434; 53/436
[58] Field of Search ............... 53/429, 436, 433, 432, 53/117, 116, 526, 528, 511, 510

[56] References Cited

U.S. PATENT DOCUMENTS

| | | | |
|---|---|---|---|
| 3,645,198 | 2/1972 | Field | 53/526 X |
| 4,377,061 | 3/1983 | Olson et al. | 53/526 X |
| 4,418,514 | 12/1983 | Spann | 53/526 X |
| 4,553,668 | 11/1985 | James et al. | 53/436 X |
| 4,595,093 | 6/1986 | Eckstein | 53/436 X |
| 5,027,582 | 7/1991 | Dearwester | 53/436 X |

FOREIGN PATENT DOCUMENTS 55-94227 7/1980 Japan.
3-17073 2/1991 Japan.

Primary Examiner—James F. Coan
Attorney, Agent, or Firm—Armstrong, Westerman, Hattori, McLeland & Naughton

[57] ABSTRACT

A packaged toilet paper made up with a strip of toilet paper which is folded zigzag into a rectangular parallelepipedic body and vacuum-packaged with an airtight synthetic resin sheet, and a method of manufacturing a packaged toilet paper by folding a strip of toilet paper zigzag into a rectangular parallelepipedic body, sealing the rectangular parallelepipedic body of toilet paper with an airtight synthetic resin sheet, and by executing a vacuum packaging, with flat solid members being put and pressed respectively on the top and bottom faces of the toilet paper sealed with said synthetic resin sheet.

1 Claim, 2 Drawing Sheets

PACKAGED TOILET PAPER AND METHOD OF MANUFACTURING THEREOF

BACKGROUND OF THE INVENTION

The present invention relates to a packaged toilet paper mainly for domestic use and a method of manufacturing thereof.

A conventional toilet paper is generally sold in a state where a narrow paper strip is rolled up onto a paper tube core.

And, in case of using such a toilet paper, a shaft is put through aforesaid paper tube core and fixed to the supporting means, and then a strip of paper is pulled out of the toilet paper in a rolled-up state.

However, there has been a problem that waste spaces are produced when a lot of toilet papers are piled because a toilet paper which is wound into a roll becomes cylindrical in shape. Further, there has been another problem that the paper tube core on which a paper strip is wound, because the core is hollow and this hollowed portion occupies a waste volume, becomes bulky in usual transportation and storage.

In addition, aforesaid paper tube core is only abandoned without reused, wasting resources.

On the other hand, in the case of paper used for computer, etc., there has known a method to form a paper strip into a hexahedral body by folding zigzag such a paper strip, because a rolled-up paper strip becomes bulky. If said method is introduced for manufacturing toilet papers, the paper tube cores become unnecessary and, the occupying volume of toilet paper produced by such a method can largely be reduced in compared with that produced by aforesaid method.

However, the paper used for toilet paper, different from aforesaid paper used for computer, etc., is soft and, as a result, becomes only a fat and bulky hexahedral body even if it is folded into a zigzag state, and cannot become an effective volume-reducing measure in comparing with aforesaid rolled-up toilet paper which is wound with a certain tension. Moreover, because of its softness, a toilet paper has a disadvantage to deform if it is crumpled or its corner is pressed while being handled.

SUMMARY OF THE INVENTION

The present invention has been made in view of above-mentioned circumstances and, accordingly, it is an object of this invention to provide a packaged toilet paper whose occupying volume is small enough to rationalize transportation, exhibition, and storage, and whose paper tube core becomes unnecessary, and a method of manufacturing such a packaged toilet paper.

The packaged toilet paper relating to this invention with above-mentioned object comprises a packaged toilet paper made up with a continuous strip of toilet paper which is packaged with a synthetic resin sheet, wherein aforesaid strip of toilet paper is folded zigzag with a constant pitch into a rectangular parallelepipedic body, an airtight synthetic resin sheet is used for aforesaid synthetic resin sheet, and aforesaid rectangular parallelepipedic body is vacuum-packaged with aforesaid airtight synthetic resin sheet.

Then, the method of manufacturing the packaged toilet paper with above-mentioned object comprises a process to fold the toilet paper zigzag into a rectangular parallelepipedic body, a process to seal aforesaid rectangular parallelepipedic body of toilet paper with an airtight synthetic resin sheet, and a process to perform a vacuum packaging, with flat solid members being put and pressed respectively on the top and bottom faces of the toilet paper sealed with said synthetic resin sheet.

In this invention, the rectangular parallelepipedic body includes a cubic body, and the synthetic resin sheet includes a laminated sheet consisting of a synthetic resin sheet and a metal foil (aluminum foil, for example).

The occupying volume of the packaged toilet paper relating to this invention, because it is made up with a strip of toilet paper which is folded zigzag into a rectangular parallelepipedic body and vacuum-packaged with an airtight synthetic resin sheet, is reduced to nearly half or less that of conventional rolled-up toilet paper. As a result, this packaged toilet paper becomes easy to transport and compact enough to save the exhibiting or storing space and, if the occupying volume is the same as that of conventional toilet paper, the longer toilet paper can be used.

In addition, this packaged toilet paper needs no paper tube core which is necessary for the conventional rolled-up toilet paper and becomes very sanitary because it is totally sealed with an airtight synthetic resin sheet.

Further, this packaged toilet paper has an advantage to be easy to handle in storing and transporting it because its soft toilet paper is compressed to be hard by the zigzag folding and vacuum packaging.

Accordingly, for instance, in case a house wife buys said packaged toilet paper at a shop and take it home, it does not become bulky because it is compact and, further, it has an advantage to save the storing space at home.

As to the method of manufacturing the packaged toilet paper relating to this invention, because it is so manufactured as to be easy to transport and store as mentioned above and, further, because it is vacuum-packaged while compressed with a flat solid member from top and bottom respectively, its top and bottom faces become smooth to show a good appearance.

Moreover, the produced packaged toilet paper has a good shape as a product because it has no camber, bend, nor wrinkles, which makes it convenient to pile or arrange a lot of said packaged toilet papers.

Accordingly, the packaged toilet paper and the method of manufacturing thereof relating to this invention, because they have the excellent effects as discussed above, will offer a convenience to many people when said packaged toilet paper becomes widely used.

DESCRIPTION OF THE PREFERRED EMBODIMENT

Figure 2:
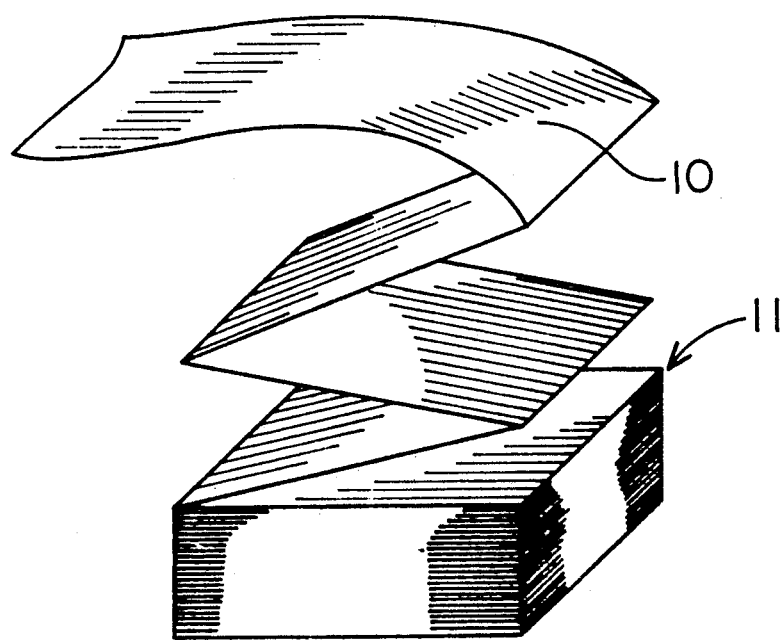
FIG. 2 is a perspective view showing a toilet paper folded zigzag with a constant pitch.

As shown in FIG. 2, a strip of toilet paper 10 having a specified width is folded zigzag with a constant pitch into a rectangular parallelepipedic body 11. And, if necessary, a paper band is applied at right angles to the folding direction so that the folded toilet paper may not become disordered.

Then, the rectangular parallelepipedic body 11 of said toilet paper is packaged with an airtight synthetic resin sheet 12. For this synthetic resin sheet 12, though it may be a good practice to use a piece of airtight synthetic resin sheet made of polyvinylidene chloride, etc., it is preferable to use a gas-impermeable film such as a cellophane-laminated polyethylene film, an aluminum-foil-laminated polyethylene film, a polycarbonate-laminated polyethylene film, or a polyester-laminated polyethylene film.

It is also a good practice to used a three-layer laminated sheet consisting of aforesaid film to which a nylon sheet, etc. is adhered for improving the strength.

For packaging the toilet paper, there is a method to form said synthetic resin sheet into a bag beforehand, put the rectangular parallelepipedic body 11 of the toilet paper into the bag, and to seal the bag by thermal sealing, leaving an air-discharging port; and another method to put aforesaid rectangular parallelepipedic body 11 on a piece of synthetic resin sheet and wrap it up from the periphery with said synthetic resin sheet, and to seal the abutting sides of the sheet by thermal sealing, leaving an air-discharging port.

Figure 1:
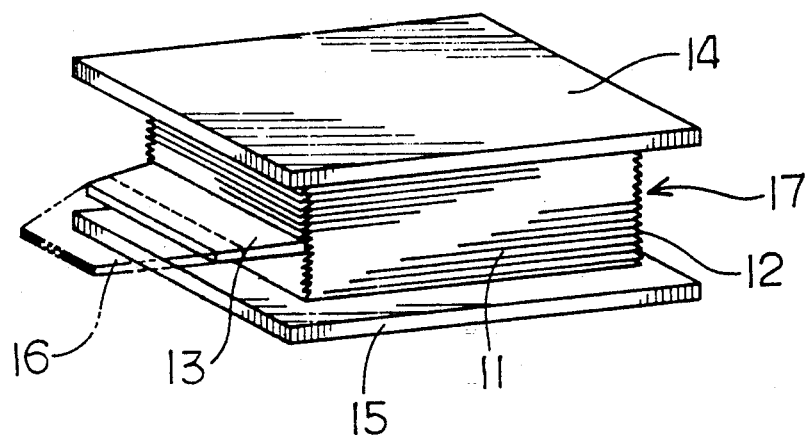
FIG. 1 is a perspective view showing the method of packing the packaged toilet paper relating to one embodiment of this invention.

FIG. 1 shows an example of wrapping the rectangular parallelepipedic body 11 of the toilet paper with the synthetic resin sheet 12 provided with an air-discharging port 13 on the side face. As shown in the figure, there are disposed flat plates 14 and 15 each of which is one example of flat solid members to the top and bottom faces of the rectangular parallelepipedic body 11 respectively and, via these plates, the rectangular parallelepipedic body 11 of the toilet paper is pressed from top and bottom by a pneumatic cylinder (not shown in the figure), and there is attached a suction port 16 which is connected to a vacuum pump (not shown in the figure) so as to reduce the inner pressure of the package down to a vacuum or to a sufficiently low level for vacuum packaging, and then the package is sealed by thermal sealing at the section of aforesaid air-discharging port 13.

Figure 3:
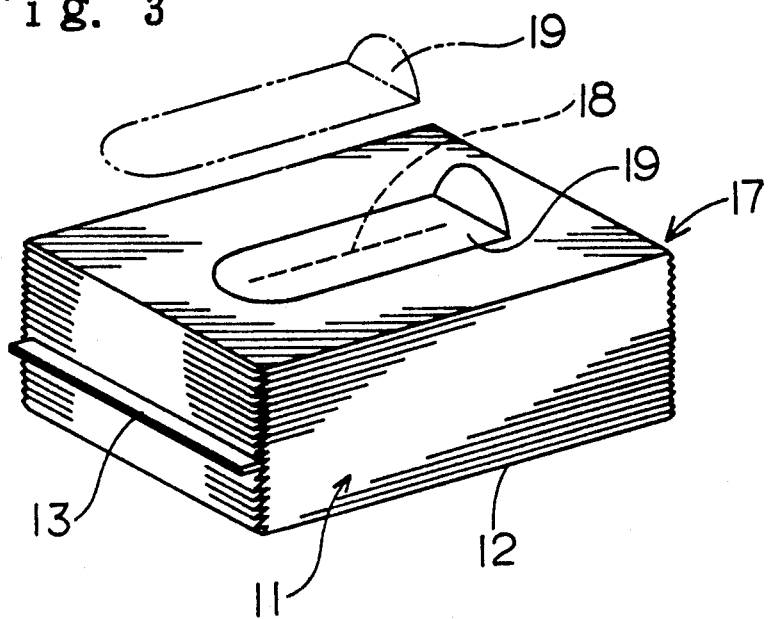
FIG. 3 is a perspective view of a vacuum-packaged toilet paper.

FIG. 3 shows a packaged toilet paper 17 which has been sealed by above-mentioned process and, as shown in the figure, there is provided a slit 18 on the top face and the slit 18 is covered with an adhesive tape 19. The vacuum packaging is executed in a state where said slit 18 is formed and said adhesive tape 19 is sticked on said synthetic resin sheet 12 beforehand.

Figure 4:
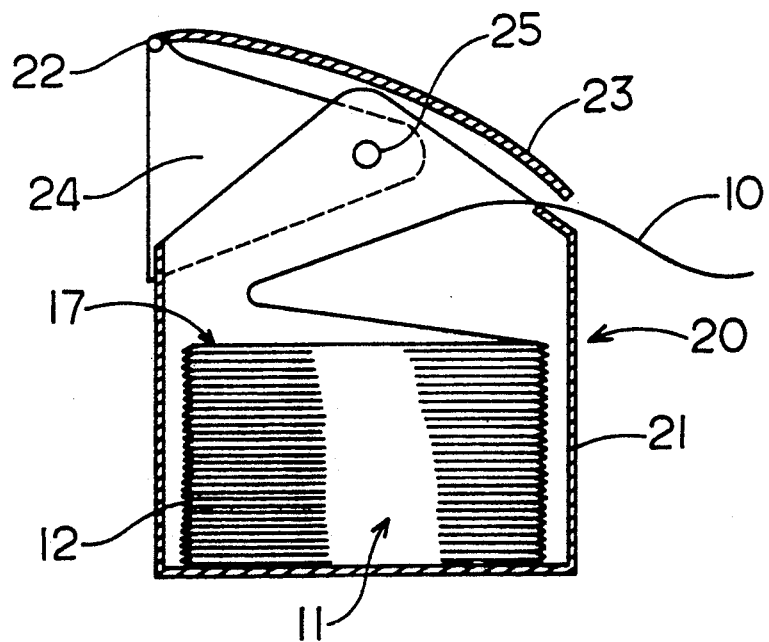
FIG. 4 is a side sectional view showing said packaged toilet paper in a state of being used.

FIG. 4 shows said packaged toilet paper 17 in a state of being put in a toilet-paper holder 20, wherein aforesaid adhesive tape 19 is peeled off, the slit 18 is split so that the top portion of the packaging sheet may be opened, the packaged toilet paper 17 is put in a box body 21, and the head portion of the paper strip is pulled out of the top portion of the box body 21 so that the portion of the paper strip which is pulled out of the box can be cut off by a cutter 23 which is rotatably attached via pins 22.

Aforesaid box body 21 is provided with holes at the top portion thereof so that the box body may be attached to the side plates 24 for supporting a conventional rolled-up toilet paper by inserting pins 25 into the pin holes of the side plates 24.

In addition, said toilet paper 10 may be put in aforesaid toilet-paper holder 20, with the packaging sheet of said toilet paper 10 being thoroughly removed.

In the embodiment described above, though the air-discharging port is disposed on the side face of the package in vacuum packaging, it is possible to dispose the port on either top or bottom flat solid member. Further, the present invention is applicable to the case wherein the sealed packaging of aforesaid rectangular parallelepipedic body 11 is executed in a vacuum though, in above-mentioned embodiment, the vacuum packaging is executed by discharging the air inside the package after sealing the rectangular parallelepipedic body 11 of toilet paper with the synthetic resin sheet 12.

What is claimed is:

1. A method of manufacturing a packaged toilet paper comprising folding toilet paper in a zigzag manner into a rectangular parallelepipedic body, enclosing aforesaid rectangular parallelepidic body of toilet paper in an air impermeable synthetic resin containing sheet, and vacuum packaging said sheet with flat solid members placed and pressed respectively on the top and bottom faces of the toilet paper enclosed with said synthetic resin containing sheet.

* * * * *